Figure 1:
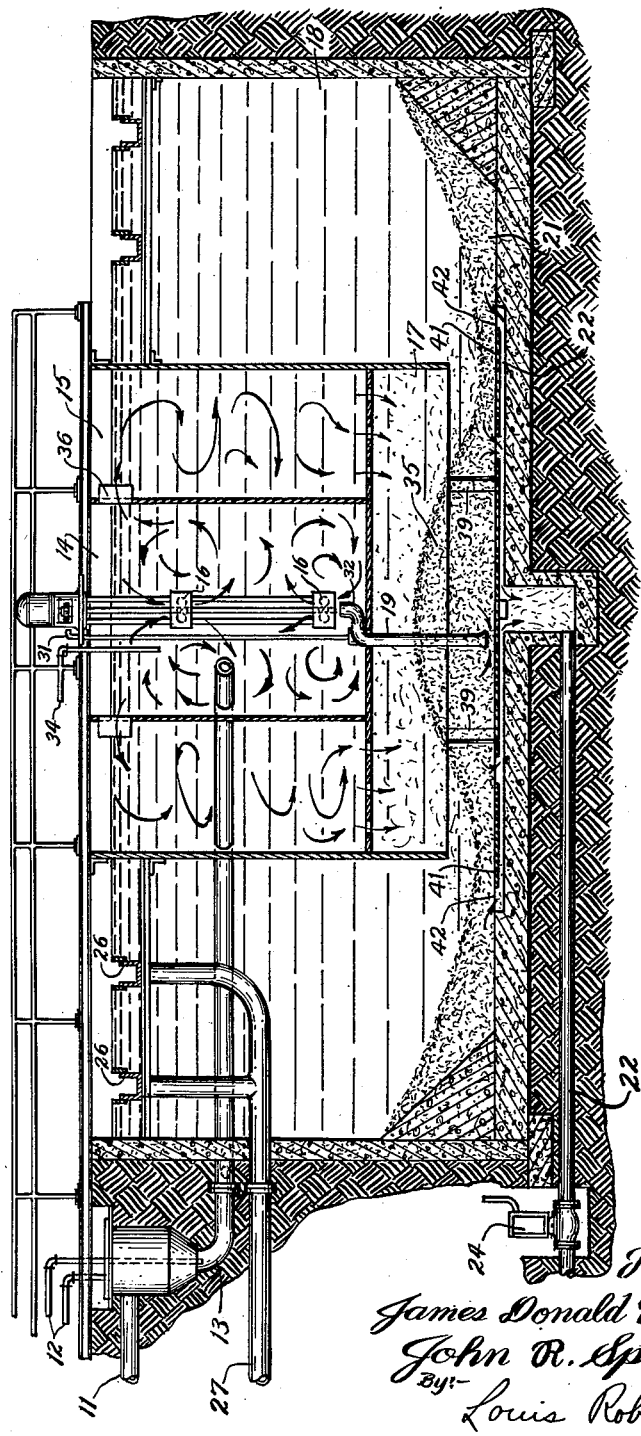

Nov. 6, 1951     J. D. WALKER ET AL     2,573,941
WATER TREATING APPARATUS AND METHOD
Filed June 20, 1947     2 SHEETS—SHEET 1

Inventors.
James Donald Walker &
John R. Sperry.
By:- Louis Robertson Atty.

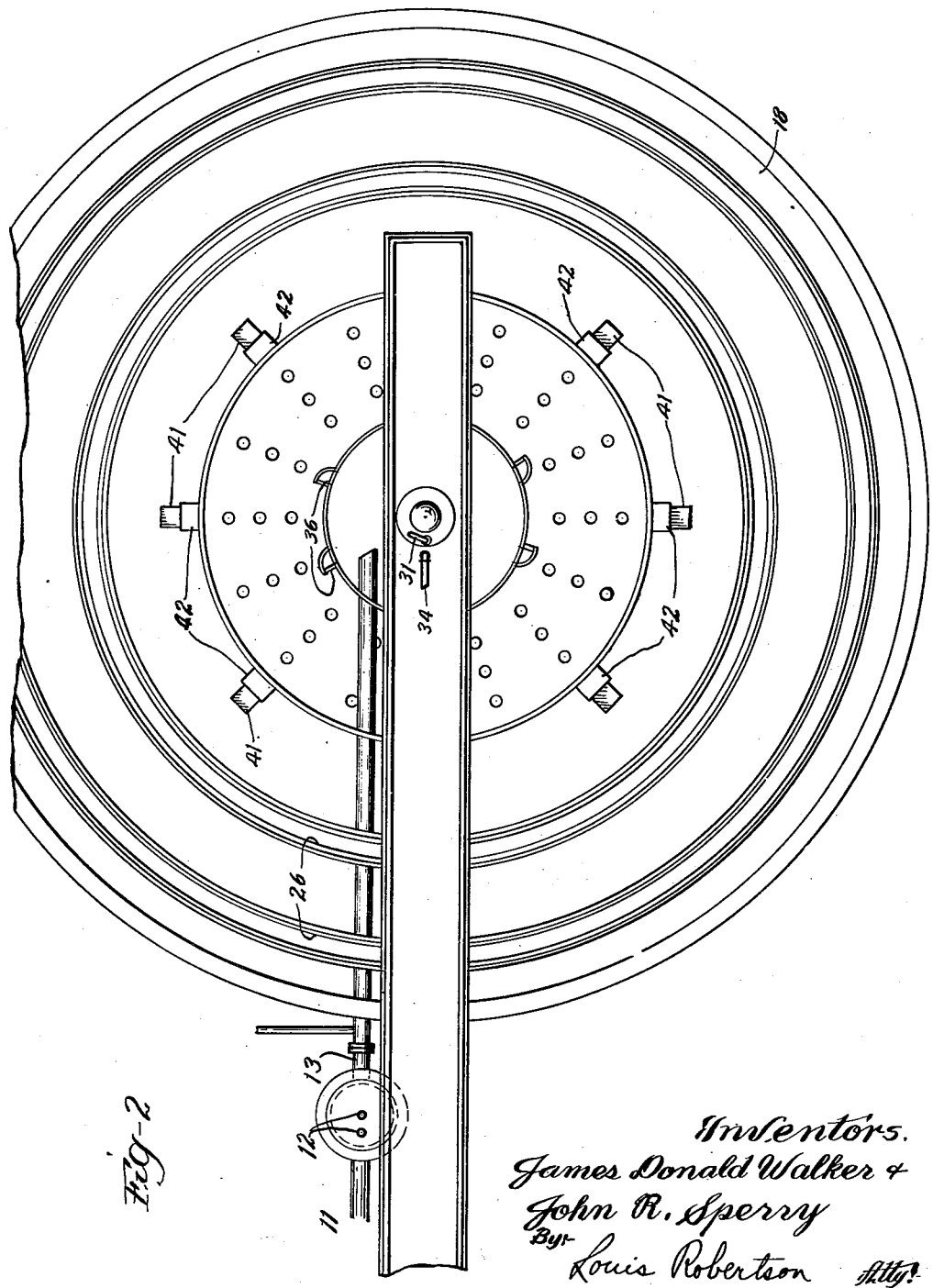

Patented Nov. 6, 1951

2,573,941

UNITED STATES PATENT OFFICE 2,573,941

WATER TREATING APPARATUS AND METHOD

James Donald Walker and John R. Sperry, Aurora, Ill., assignors to Walker Process Equipment, Inc., Aurora, Ill., a corporation of Illinois Application June 20, 1947, Serial No. 755,958

5 Claims. (Cl. 210—16)

1

In the softening of water by the lime-soda process, there is a constant striving for greater efficiency. Of course, it is necessary not only to have efficiency in mixing the chemicals with the water but also in precipitation of the hardness imparting ingredients from the water and in the ultimate clarification of the water by separating the clear water from the precipitates.

It has long been recognized that precipitation was hastened by seeding the incoming water with the products of previous precipitation. With respect to clarification, it has long been thought desirable to pass the water upwardly through a slurry blanket, perhaps with the theory that the slurry particles in the blanket would act as a filter to filter out any very fine precipitate. In maintaining this slurry, the usual practice has been to recirculate substantial quantities of the fairly light slurry, carrying it back to the mixing chamber for mixing with raw water.

The present inventors have determined that both the blanket and the recirculation of light slurry is disadvantageous. The presence of large numbers of particles forming the blankets necessarily restricts the flow space for water between the particles so that with a given volume of water flow, the upward speed of the water is higher than if no blanket were maintained. Accordingly, the present invention operates on the theory of settling the precipitate as quickly as possible and maintaining the clarifying zone as free from precipitates as possible so that the water therein is as still as possible. Not only does this reduce the rate of upward flow of the water but it avoids minute eddy currents produced by the relative settling of the blanket particles with respect to the water. To this end, the present invention recirculates only the heavier particles which have already settled. Furthermore, it draws these particles not from below the clarifying zone, where nearly all of the light particles settle out, but from a preliminary settling zone where almost nothing settles except fairly large particles. Accordingly, relatively few small particles are recirculated to increase the difficulty of ultimate clarification. Substantially all of the particles recirculated settle out promptly and leave the main portions of the clarifying zone for settling of the finer particles.

Additional objects and advantages of the invention will be apparent from the following description and from the drawings in which:

Figure 1 is a somewhat diagrammatic vertical sectional view through the form of the apparatus of this invention chosen for illustration; and Fig. 2 is a fragmentary view looking down on the apparatus shown in Fig. 1.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

General explanation

In the illustrated form of the invention, raw water is supplied through pipe 11 and softening chemicals are supplied through pipe 12. These flow together through pipe 13 to a mixing chamber 14 where they are agitated by impellers 16. From the mixing chamber the mixture flows to a reaction chamber 15, and from there it flows to a stilling zone or chamber 17 from which it flows into the clarifying chamber 18. The heavier particles of precipitate settle to the floor of the stilling zone 17, and are drawn by pipe 19 back into the mixing chamber 14. The lighter particles of precipitate will settle mostly below the clarifying chamber 18 as seen at 21. These finer particles will periodically be drawn off through wasting conduits 22 which may be controlled by an electrically operated valve 24. The valve 24 may be controlled by a suitable time switch.

The clarified water at the top of the clarifying chamber 18 flows into launders 26 from which it flows out through pipe 27.

Return of precipitate

The return of the heavy precipitate is an important part of the present invention. It has been the practice heretofore to return both the fine and heavy precipitates or to return mainly the fine precipitates. Returning the heavy precipitates has the advantage that nothing has returned which will not settle out quite easily. Hence the load on the clarifying chamber is not increased by this return of the heavy precipitates. During the reaction the heavy returned precipitates tend to increase their size by accretion so that they are settled even more readily the second time than the first.

The amount of return is controlled by means of a handle 31 which swings the neck portion 32 of return pipe 19 closer to or more remote from the lower impeller 16. When it is closer to the impeller 16, it is subjected to considerable suction therefrom so that substantial return flow of the precipitate is induced.

The total amount of precipitation is sufficient so that there is usually a substantial pile 35 of relatively large precipitates from which the pipe 19 may draw. Any excess in the quantity of precipitates is swept out into the bottom of the clarifying chamber 18. Because a substantial proportion of the precipitates have already settled out, a relatively small proportion of the cross-section of the clarifying chamber 18 is occupied by the particles to be settled, and, therefore, the upward movement of the water has substantially the entire cross-section for its flow. Hence the upward movement of the water is at a relatively low speed, and settling of the particles is relatively rapid.

It is preferred that the wasting conduits 22 open only close to or under the settling chamber 18 so as not to reduce the pile of larger particles 32 enough to expose the end of return pipe 19. The wasting is mainly from the pile 21 which is made up of the finer particles and of the larger particles which are left over when the pile 32 reaches the height which it normally maintains. In this way an adequate supply of larger particles 32 is ensured.

It will be observed that there is considerable agitation within the tank 14 to ensure thorough mixing of the water, chemicals, and the returned precipitates. An additional chemical may be added within this chamber by a pipe 34. Water flows through ports 36 with sufficient speed to cause considerable agitation in the reaction chamber 15. This chamber gives plenty of time for the products to complete their reaction and for the precipitates to form and to flocculate to some extent. The water passes into the stilling chamber 17 more gently but still has enough agitation to largely prevent the finer particles from settling to the pile 35 during the short time the water is in the stilling chamber. The return pipe 19 has its inlet adjacent to the floor at the center thereof. Thus, it is below a relatively quiescent zone of the stilling chamber. The stilling chamber allows the water to quiet down sufficiently so that it flows out gently between the legs 39 without enough eddy currents to interfere with settling or to produce any substantial return flow into the stilling chamber.

From the foregoing, it is seen that a water softener is provided which is exceptionally efficient and which can treat a surprisingly large quantity of water for space available. The wasting conduits 22 may include troughs 41 covered by plates 42.

We claim:

1. The method of softening water which includes mixing with the raw water softening chemicals and heavy recirculated precipitates later described, agitating said mixture a sufficient time for substantial completion of the reaction and precipitation, then passing the water through a stilling zone while maintaining a speed of movement such that substantially only the heavier precipitates settle, selectively collecting said heavier precipitates in an area from which said recirculated precipitates mentioned are drawn, and passing the remaining water and lighter precipitates through a clarifying zone in which the remaining precipitates settle, withdrawing excess settled precipitates from the tank but maintaining a sufficient volume therein to retain a stock pile of heavier recirculating precipitates.

2. Water softening apparatus including a clarifying tank, partition means therein forming an agitation chamber and a clarifying zone and partially segregating at the bottom of the tank a stilling chamber through which water from the agitation chamber flows to the clarifying zone of the tank and in which only heavier particles settle, the stilling chamber communicating with the clarifying zone adjacent the bottom of the tank, and inlet for raw water discharging to the agitation chamber, means for supplying water softening chemicals to the raw water, means for drawing clarified water from the upper part of the clarifying zone, an impeller in the agitation chamber, means for driving the impeller, and recirculation means including a conduit having its inlet in the stilling chamber adjacent the floor below a relatively quiescent zone thereof and having its outlet in the agitation chamber in the suction zone of the impeller whereby some of the heavier particles which settle in the stilling chamber are recirculated.

3. Water softening apparatus including a clarifying tank, partition means therein forming an agitation chamber and a clarifying zone and partially segregating at the bottom of the tank a stilling chamber through which water from the agitation chamber flows to the clarifying zone of the tank and in which only heavier particles settle, the stilling chamber communicating with the clarifying zone adjacent the bottom of the tank, and inlet for raw water discharging to the agitation chamber, means for supplying water softening chemicals to the raw water, means for drawing clarified water from the upper part of the clarifying zone, an impeller in the agitation chamber, means for driving the impeller, recirculation means including a conduit having its inlet in the stilling chamber adjacent the floor below a relatively quiescent zone thereof and having its outlet in the agitation chamber whereby some of the heavier particles which settle in the stilling chamber are recirculated, and means for withdrawing excess settled precipitate.

4. Water softening apparatus including a clarifying tank, partition means therein forming an agitation chamber and a clarifying zone and partially segregating at the bottom of the tank a stilling chamber through which water from the agitation chamber flows to the clarifying zone of the tank and in which only heavier particles settle, the stilling chamber communicating with the clarifying zone adjacent the bottom of the tank, an inlet for raw water discharging to the agitation chamber, means for supplying water softening chemicals to the raw water, means for drawing clarified water from the upper part of the clarifying zone, an impeller in the agitation chamber, means for driving the impeller, recirculation means including a conduit having its inlet in the stilling chamber adjacent the floor below a relatively quiescent zone thereof and having its outlet in the agitation chamber whereby some of the heavier particles which settle in the stilling chamber are recirculated; said apparatus including a means substantially preventing the recirculation of any precipitate from the clarifying zone.

5. Water softening apparatus including a clarifying tank, partition means therein forming an agitation chamber and a clarifying zone and partially segregating at the bottom of the tank a stilling chamber through which water from the agitation chamber flows to the clarifying zone of the tank and in which only heavier particles settle, the stilling chamber communicating with the clarifying zone adjacent the bottom of the tank, partition means forming a reaction chamber between the agitation chamber and the stilling chamber receiving water from the agitation chamber and discharging it only to the settling chamber, an inlet for raw water discharging to the agitation chamber, means for supplying water softening chemicals to the raw water, means for drawing clarified water from the upper part of the clarifying zone, an impeller in the agitation chamber, means for driving the impeller, and recirculation means including a conduit having its inlet in the stilling chamber adjacent the floor below a relatively quiescent zone thereof and having its outlet in the agitation chamber whereby some of the heavier particles which settle in the stilling chamber are recirculated.

JAMES DONALD WALKER.
JOHN R. SPERRY.

REFERENCES CITED

The following references are of record in the file of this patent:

UNITED STATES PATENTS

| Number | Name | Date |
|---|---|---|
| 2,245,587 | Hughes | June 17, 1941 |
| 2,317,847 | Duden | Apr. 27, 1943 |
| 2,391,738 | Prager | Dec. 25, 1945 |
| 2,419,004 | Bieker et al. | Apr. 15, 1947 |
| 2,427,886 | Walker | Sept. 23, 1947 |
| 2,436,749 | Galandark et al. | Feb. 24, 1948 |
| 2,442,809 | Hallier et al. | June 8, 1948 |
| 2,452,991 | Butcher | Nov. 2, 1948 |